United States Patent
Kusumoto (10) Patent No.: US 6,765,746 B2
(45) Date of Patent: Jul. 20, 2004

(54) METHOD AND APPARATUS EMPLOYED IN DISK DRIVE FOR RETRACTING HEAD WHEN POWER SUPPLY HAS BEEN INTERRUPTED

(75) Inventor: Tatsuharu Kusumoto, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 10/091,524

(22) Filed: Mar. 7, 2002

(65) Prior Publication Data

US 2002/0141102 A1 Oct. 3, 2002

(30) Foreign Application Priority Data

Mar. 30, 2001 (JP) ........................................ 2001-101335

(51) Int. Cl.[7] .............................................. G11B 21/02
(52) U.S. Cl. ...................................................... 360/75
(58) Field of Search ................................ 360/75, 78.04, 360/69, 61, 73.03; 318/563, 561, 280

(56) References Cited

U.S. PATENT DOCUMENTS

| 4,786,995 A | * | 11/1988 | Stupeck et al. | ................ 360/75 |
| 6,140,784 A | * | 10/2000 | Mazda | ........................ 318/280 |
| 6,567,232 B1 | * | 5/2003 | Klaassen | ...................... 360/75 |
| 6,594,102 B1 | * | 7/2003 | Kanda et al. | .................. 360/75 |

FOREIGN PATENT DOCUMENTS

| JP | 8-63920 | 3/1996 |
| JP | 11-297014 | 10/1999 |
| JP | P3016476 | 12/1999 |
| JP | P2000-21073 A | 1/2000 |
| JP | P2000-90613 A | 3/2000 |

* cited by examiner

Primary Examiner—Andrew L. Sniezek
(74) Attorney, Agent, or Firm—Pillsbury Winthrop LLP (57) ABSTRACT

While a disk drive is operating, a retract time period, which is required for moving a head from its present position to a predetermined retract change position using a back EMF that occurs in an SPM, is determined. Upon power-off of a power supply for the disk drive, at first, a first retract operation for moving the head using the back EMF of the SPM is started. When the retract time period has elapsed after the power-off of the power supply, the first retract operation is switched to a second retract operation for moving the head onto a ramp using a charge accumulated in a retract capacitor.

22 Claims, 9 Drawing Sheets

METHOD AND APPARATUS EMPLOYED IN DISK DRIVE FOR RETRACTING HEAD WHEN POWER SUPPLY HAS BEEN INTERRUPTED

CROSS-REFERENCE TO RELATED APPLICATIONS

This application is based upon and claims the benefit of priority from the prior Japanese Patent Application No. 2001-101335, filed Mar. 30, 2001, the entire contents of which are incorporated herein by reference.

BACKGROUND OF THE INVENTION

1. Field of the Invention

The present invention relates to a disk drive capable of at least reading data, using a head, and more particularly to a method and apparatus that are employed in the disk drive and suitable for retracting a head to a predetermined retract position when power supply has been interrupted.

2. Description of the Related Art

Hard disk drives (magnetic disk drives) for reading/writing data using a head are known as disk drives for at least reading data, using a head. Among the disk drives, those in which a ramp load system is installed have recently come to be available. In the ramp load system, when the apparatus is shifted to an idle state, the front end of an actuator, which supports a head, is retracted to a retract area, a "ramp, provided at the radially outermost side of a disk (disk medium). In other words, the head is moved to a position off the disk. Further, in a ramp load system, when the idle state is released, the head is moved from the retract area onto the disk, i.e. is loaded onto the disk. Suppose here that the idle state indicates both a state in which the disk has stopped rotating, and a state in which the supply of power to a part of a circuit is stopped while the disk is rotating.

In the ramp load system, since the head's retract area is off the disk, the attachment of the head to the disk can be avoided when the disk does not rotate. Accordingly, the ramp load system is effective when increasing the recording density of the disk by smoothing the surface of the disk and reducing the floating amount of the head.

However, if unintentional power-off occurs while the head is floating on the disk in accordance with the rotation of the disk, it is very possible that the head will land on the disk and stick thereto. In light of this, in hard disk drives that employ a ramp load system, various types of contrivances have been made to automatically retract the head upon power supply interruption.

Jpn. Pat. Appln. KOKAI Publication No. 11-297014 discloses a method for retracting a head when the interruption of power supply has occurred. In this method, power supplied to a voice coil motor (VCM) driver is classified into three levels, those being supplied in different time periods. Further, in this method, at a first step, an actuator is stopped, then at a second step, a head is moved at a low speed to a position near a ramp, and at a third step, the head is accelerated and retracted to a retract position. This configuration enables the speed of the head at the time of its collision against the ramp to be set at a sufficiently low value, thereby reducing the damage to the ramp. At the aforementioned first to third steps after power supply failure, charges (electric energy), accumulated in capacitors c3, c1 and c2 while power is being supplied to the HDD, are supplied to the VCM driver. The capacitors are set such that a higher voltage is obtained from the capacitor c2 than from the capacitor c1.

The above-mentioned publication also describes that, instead of using the capacitors, the back EMF (electromotive force) of a spindle motor for rotating the disk is rectified and used as power to be supplied to the VCM driver at each step after power off. The back EMF of the spindle motor is generated due to its own inertia after power off.

The above-described prior art considers solving the problem of the ramp being damaged, upon a power supply failure, when that the head collides with the ramp at high speed when retracted. However, no consideration is given to solving the problem that, upon power supply interruption, the disk stops rotating, the floating amount of the head reduces and the head may stick thereto. Specifically, in the prior art, the actuator presently operating is stopped at the first step. At this time, since the supply of power has already stopped, the rotational speed of the spindle motor is further reduced while the actuator is being stopped. Accordingly, it is very possible that the spindle motor may stop rotating before the head is completely retracted, and hence the head may land and stick to the disk.

Moreover, in the case of small hard disk drives such as 1.8-inch ones, it is difficult for the charges accumulated in the capacitors or the back EMF of the spindle motor, to cover the power required by the VCM driver to retract the head upon power supply interruption, for the following reason: To cover the power, required to retract the head at the interruption of power supply, by only the charges of the capacitors, the capacitors must have a large capacitance. This makes it difficult to downsize the entire apparatus. In light of this, the use of capacitors is not suitable. On the other hand, in small hard disk drives, the spindle motor is also small and hence does not provide a high back EMF. Accordingly, it is difficult for only the back EMF of the spindle motor to cover the power required by the VCM driver to retract the head upon power supply interruption. Therefore, the use of the back EMF of the spindle motor is not suitable, either.

BRIEF SUMMARY OF THE INVENTION

The present invention has been developed in light of the above circumstances, and aims to enable a reliable and safe retract of a head upon power supply interruption, without using capacitors of a large capacitance, even if the back EMF of a spindle motor is insufficient.

According to an aspect of the invention, there is provided a method of supplying, upon power-off of a power supply for a disk drive, a current to a voice coil motor to drive a head actuator that supports a head, thereby retracting the head onto a ramp provided outside a disk medium near an outer periphery of the disk medium. In the method, during the operation of the disk drive, a time period required to move the head from a position of the head to a predetermined retract change position, using a back EMF that occurs, upon the power-off of the power supply, in a spindle motor is determined to be a retract time period. Upon the power-off of the power supply, the supply of the back EMF of the spindle motor to the voice coil motor as a driving source for a head actuator is started. When the retract time period has elapsed after the power-off of the power supply, i.e. when the head has reached a position near the retract change position, the current to be supplied to the voice coil motor is switched from a current generated by the back EMF of the spindle motor, to a current generated by discharge of a retract capacitor that accumulates a charge from the power supply.

In the above method, the retraction of the head upon power supply interruption is realized in two stages, i.e. a first retract and a second retract. In the first retract, the head is moved to a position near the predetermined retract change position, using the back EMF of the spindle motor. In the second retract, the head is moved to the ramp using a charge accumulated in the retract capacitor.

Thus, upon power supply interruption, the current generated by the back EMF of the spindle motor and the charge accumulated in the retract capacitor are selectively used as a current source for the voice coil motor used to retract the head onto the ramp. In a hard disk drive of, for example, 1.8-inch type, even if the head cannot be retracted onto the ramp only using the back EMF of the spindle motor, the above configuration enables the retraction of the head onto the ramp without a large-capacitance capacitor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
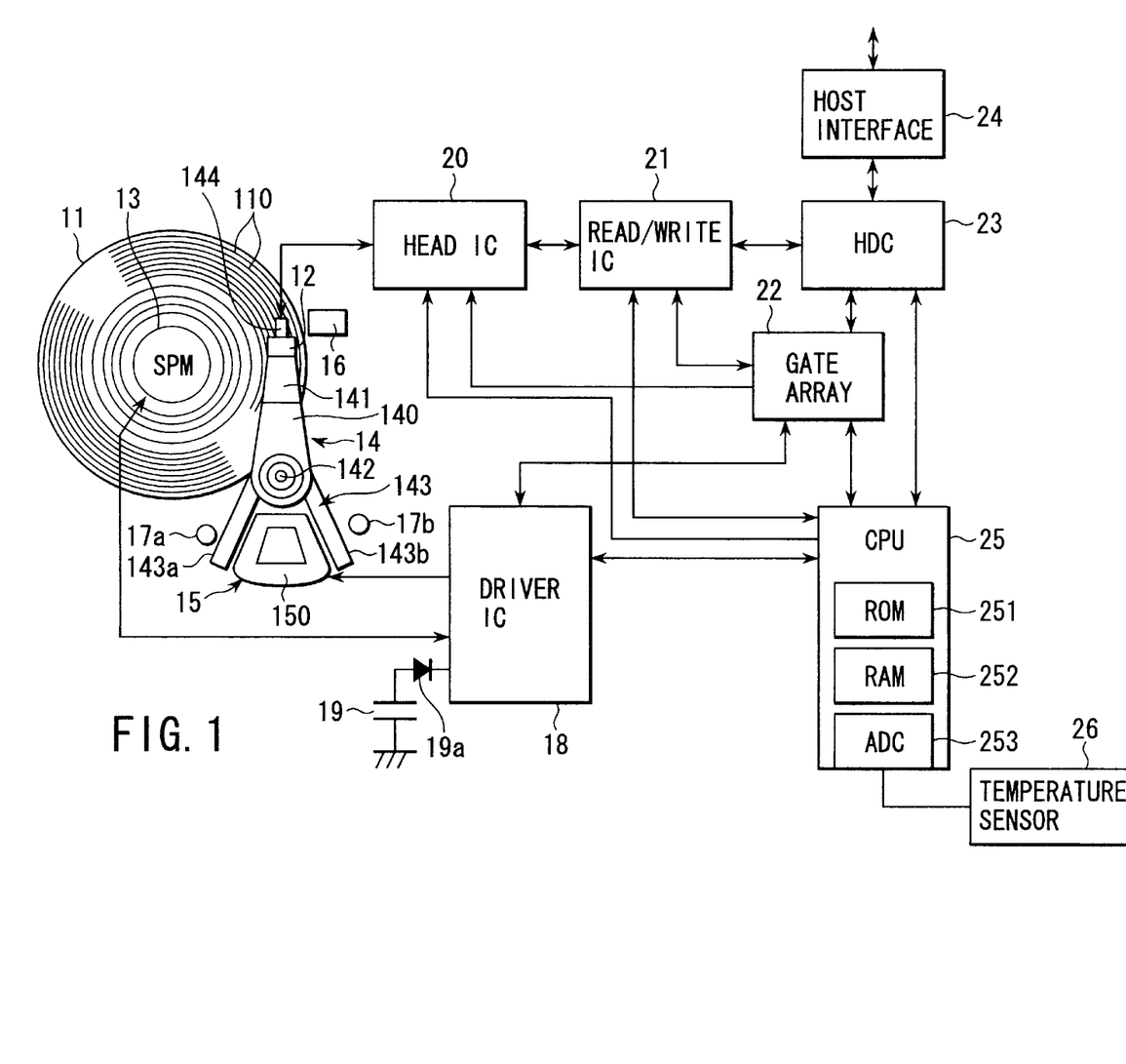
FIG. 1 is a block diagram illustrating the configuration of a hard disk drive according to an embodiment of the invention.

An embodiment, in which the present invention is applied to a hard disk drive, will be described with reference to the accompanying drawings. FIG. 1 is a block diagram illustrating the configuration of a hard disk drive according to the embodiment. The hard disk drive (HDD) shown in FIG. 1 is provided with, for example, a single 1.8-inch disk (magnetic disk medium) 11. The disk 11 has two disk surfaces (upper and lower surfaces). At least one of the two disk surfaces (e.g. both surfaces) serves as a recording surface on which data is to be recorded. A head (magnetic head) 12 is provided for each recording surface of the disk 11. The head 12 is used to write data into the disk 11 (data recording) and to read data therefrom (data reproduction). Thus, FIG. 1 shows, as an example, an HDD provided with a single disk 11. However, it is a matter of course that an HDD provided with a plurality of disks 11 in a stacked arrangement may also be employed in the embodiment.

Figure 11:
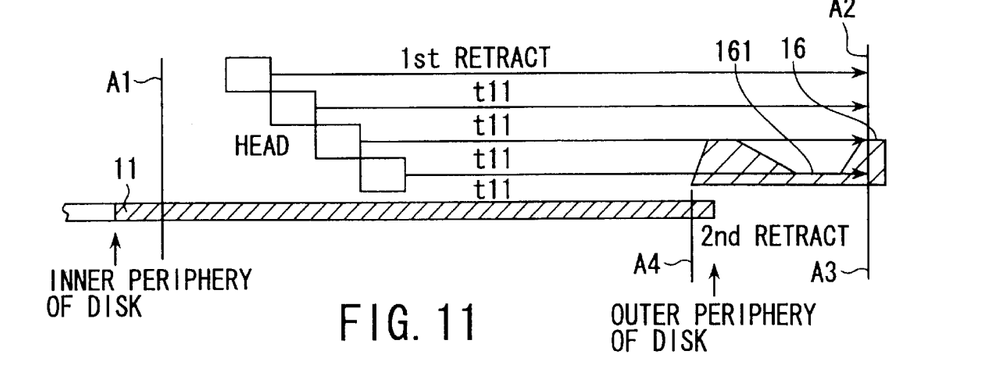
FIG. 11 is a conceptual view useful in explaining the retract of a head executed upon power supply interruption in a third modification of the embodiment.

A large number of concentric tracks 110 are formed on each recording surface of the disk 11. Each recording surface of disk 11 includes servo areas (not shown) that are formed on the disk at regular intervals and have servo data recorded thereon. The servo data is used, for example, for head positioning control that is executed for positioning a head 12 in a target position. A plurality of data sectors (not shown) are provided between each pair of adjacent servo areas. The servo areas radially extend at circumferentially regular intervals between a central portion and respective outer peripheral portions of the disk 11, over the tracks.

Figure 2:
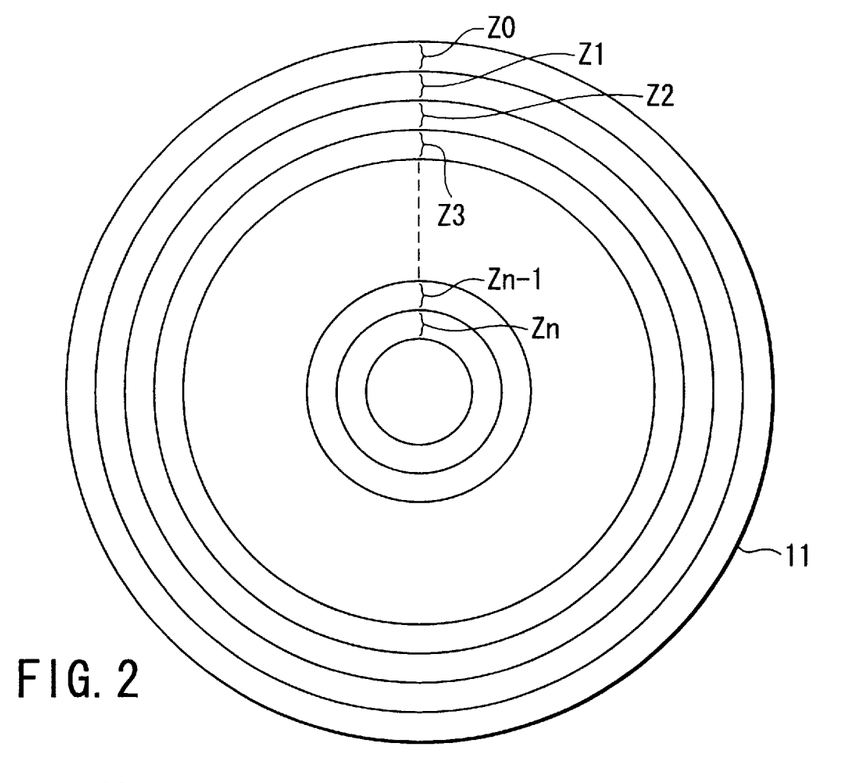
FIG. 2 is a view of a disk 11 appearing in FIG. 1, illustrating a recording surface thereof divided into a plurality of zones.

As shown in FIG. 2, each recording surface of the disk 11 is managed in a state in which it is divided into a plurality of concentric zones Z0–Zn that each include a plurality of tracks. A format of the CDR (Constant Density Recording) type is applied to the disk 11. In the CDR-type format disk 11, the further the zone is located outwards from the center of the disk 11, the longer the circumferential length of each track therein, and hence the larger the number of data sectors per each track. In other words, the further the zone is located from the center, the higher the data transfer speed (transfer rate) of each track therein. In light of this, the formatting efficiency of the disk 11 can be enhanced by effectively using outer areas of the disk 11.

The disk 11 is rotated at a high speed by a spindle motor (hereinafter referred to as an "SPM") 13. The SPM 13 could be a three-phase brushless motor. The head 12 is attached to the tip of an actuator (rotary head actuator) 14. More specifically, the head 12 is attached to the tip of a suspension 141 that extends from an arm 140 included in the actuator 14. The head 12 is moved in a radial direction of the disk 11 in accordance with the pivoting of the actuator 14, whereby the head 12 is positioned on a target track. The actuator 14 includes a voice coil motor (hereinafter referred to as a "VCM") 15 serving as its driving source. Thus, the VCM 15 drives the actuator 14.

A ramp (ramp mechanism) 16 is provided outside and near the outer periphery of the disk 11. The ramp 16 provides a head retract position, into which the head 12 is retracted when the HDD is shifted to its idle state. Actually, a tab 144, described later, which is formed at the tip of the actuator 14 and supports the head 12, is placed on the ramp 16 instead of the head 12. However, to facilitate explanation, it is described that the head 12 is retracted (unloaded) to the ramp 16.

Figure 3:
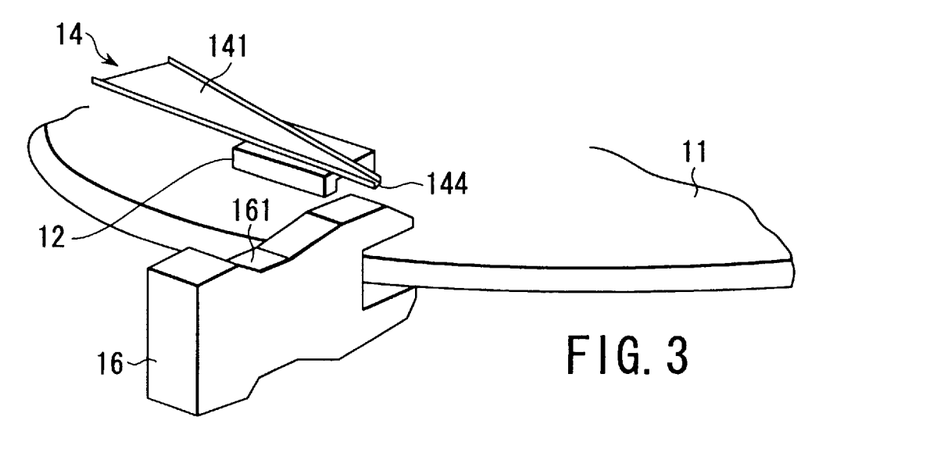
FIG. 3 is a view useful in explaining the relationship between a ramp 16 and an actuator 14 appearing in FIG. 1.

As shown in FIG. 3, the ramp 16 is provided outside and near the outer periphery of the disk 11, and in a predetermined position on the movement route of the tab 144, which is formed at the tip of the suspension 141 extending from the arm 140 of the actuator 14. The ramp 16 includes a parking portion 161, which the tab 144 is placed on or engaged with. The parking portion 161 is a depressed portion and hence prevents the head 12 from being disengaged from the ramp 16 even if an external force is applied to the HDD.

Referring again to FIG. 1, a pivot 142 is fitted in a central hole formed in the actuator 14. The pivot 142 has its lower end fixed to the base of the HDD. The actuator 14 is supported so that it can pivot about the pivot 142. A support frame 143 incorporated in the actuator 14 is, for example, V-shaped and extends in a direction opposite to the suspension 141. The support frame 143 holds a coil (VCM coil) 150 incorporated in the VCM 15.

The HDD shown in FIG. 1 is also provided with an outer periphery stopper 17a and an inner periphery stopper 17b. The outer periphery stopper 17a is used to limit the movement of the actuator 14 when retracting the head 12 onto the parking portion 161 of the ramp 16, so that the head 12 will not move over the parking portion 161 to the outside of the ramp 16. To this end, the outer periphery stopper 17a is located so that it is brought into contact with and stops an end portion 143a of the V-shaped support frame 143 of the actuator 14, which is close to the disk 11, immediately before the head 12 moves over the parking portion 161 to the outside of the ramp 16. Similarly, the inner periphery stopper 17a is used to prevent the head 12 from moving over an innermost portion of the disk 11 and colliding with the SPM 13. In other words, the stopper 17a is used to limit the movement of the actuator 14 so that the head 12 will not jump over the inner periphery of the disk 11. To this end, the inner periphery stopper 17a is located so that it is brought into contact with and stops the other end portion 143b of the V-shaped support frame 143 of the actuator 14, which is remote from the disk 11, immediately before the head 12 moves over the innermost portion of the disk 11 and collides with the SPM 13.

The SPM 13 and the VCM 15 are powered by respective driving currents (an SPM current and a VCM current) supplied from a driver IC (Integrated Circuit) 18. The driver IC 18 is connected to a capacitor 19 via a backflow-preventing diode 19a. When the HDD is in the operation state, the capacitor 19 is charged with the power supply voltage of the HDD. The capacitor 19 is a 2nd-retract capacitor, which is used as a power supply for a 2nd-retract, described later. The 2nd-retract indicates retraction of the head 12 from a retract change position 403 (see FIG. 5), described later, to the parking portion 161 of the ramp 16, which is executed upon power supply interruption to the HDD by discharging the capacitor 19 to supply its power (VCM current) to the VCM 15.

The driver IC 18 executes 1st- and 2nd-retract operations in this order when the supply of power to the HDD has been interrupted. In the 1st-retract, the back EMF (electromotive force) of the SPM 13 is used to apply power (VCM current) to the VCM 15 for a 1-st retract time period, described later, after the power supply interruption to the HDD, thereby moving the head 12 in a certain direction to a position near the retract change position 403 (see FIG. 5) described later. The 2nd-retract is executed after the 1st-retract, i.e. after a 1st-retract time period elapses from the start of the 1st-retract. In the 2nd-retract, the charge accumulated in the capacitor 19 is used to supply the VCM current to the VCM 15, thereby retracting the head 12 onto the ramp 16.

The head 12 is connected to a head IC (head amplifier circuit) 20. The head IC 20 includes a read amplifier that amplifies a read signal read by the head 12, and a write amplifier that converts write data into a write current.

The head IC 20 is connected to a read/write IC (read/write channel) 21. The read/write IC 21 executes various types of processes, such as an A/D (analog/digital) conversion process on a read signal, a coding process on write data, and a decoding process on read data, etc. The read/write IC 21 provides a pulsing function of pulsing a read signal and outputting pulsed read data, and a function of extracting servo burst data from servo data in accordance with a timing signal (a burst timing signal) from a gate array. The servo burst data is supplied to the CPU 25 and used for track following control that is executed to position the head 12 in a target area of a target track.

The gate array 22 provides a function of creating various types of timing signals, including the burst timing signal, on the basis of a read pulse signal output from the read/write IC 21, and a function of extracting a track code contained in the servo data. The track code is supplied to the CPU 25 and used for seek control that is executed to move the head 12 to a target track.

A disk controller (HDC) 23 is connected via a host interface 24 to a host system that uses the HDD. The host system is a digital device such as a personal computer. The disk controller 23 processes read data coded by the read/write IC 21, in accordance with each control signal output from the gate array 22, thereby creating data to be supplied to the host system. The disk controller 23 also codes write data transferred from the host system via the interface 24, in accordance with each control signal output form the gate array 22, thereby transferring the resultant data to the read/write IC 21.

The CPU 25 contains a ROM (Read Only Memory) 251 that prestores a control program, a RAM (Random Access Memory) 252 that provides, for example, a work area for the CPU 25, and an A/D converter (ADC) 253. A temperature sensor 26 is connected to the input of the A/D converter 253. The CPU 25 executes the control program stored in the ROM 251. When executing seek control to move the head 12 to a target track designated by a command (read/write command) output from the host system, the CPU 25 calculates, each time a new head position is detected, a time period (1st-retract time period) required to move the head 12 from the detected head position to a predetermined radial position on the disk 11 (retract change position). The 1st-retract time period is set in a controller 183 (see FIG. 4) contained in the driver IC 18. The head position indicates a cylinder position in which the head 12 is positioned.

Figure 4:
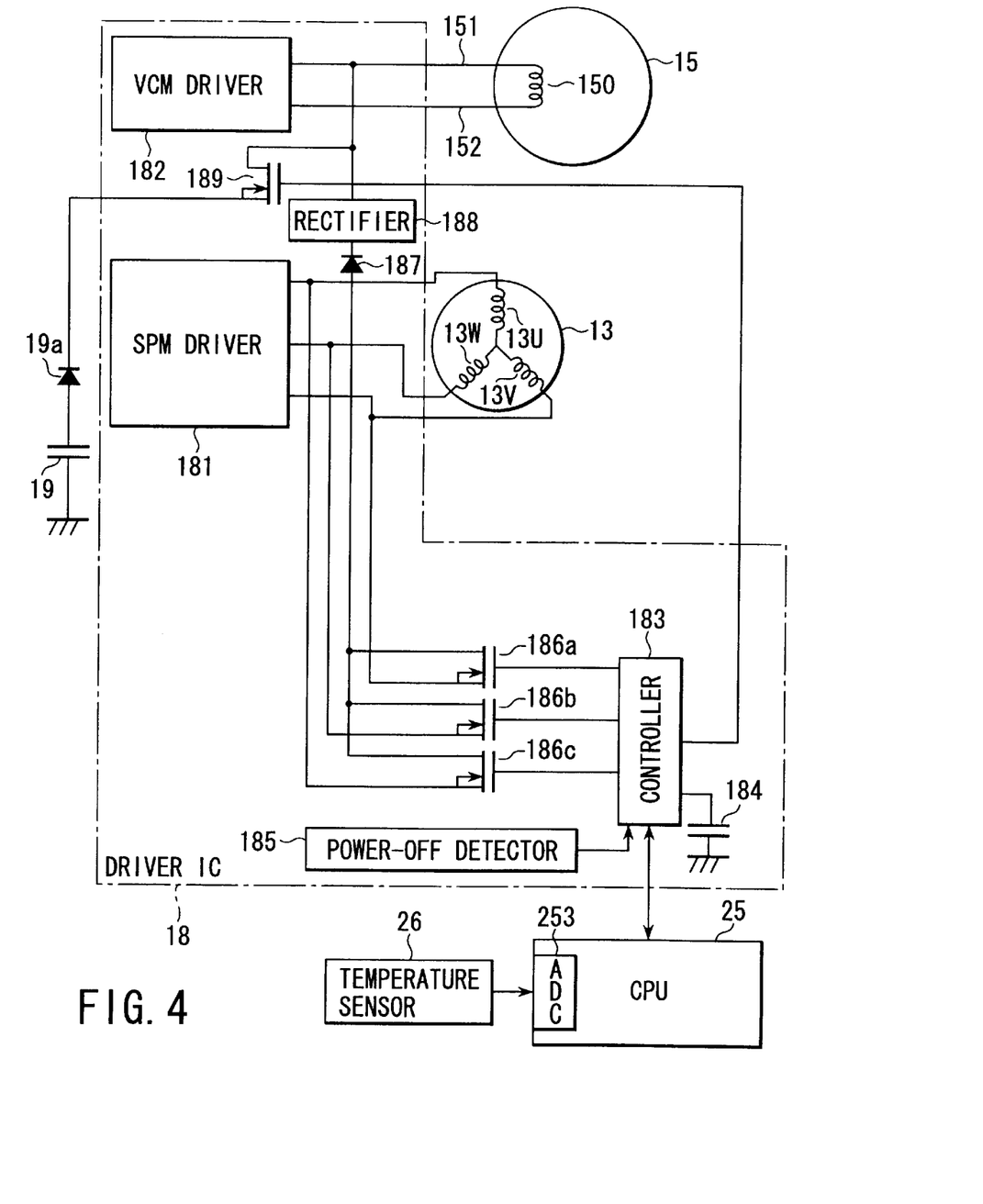
FIG. 4 is a view illustrating the configuration of a driver IC 18 appearing in FIG. 1, together with its peripheral circuit.

FIG. 4 shows the configuration of the driver IC 18, together with its peripheral circuit. The driver IC 18 includes an SPM driver 181, a VCM driver 182, the controller 183, a capacitor 184, a power-off detector 185, 1st-retract switches 186a, 186b and 186c, a diode 187, a rectifier 188 and a 2nd-retract switch 189. The SPM driver 181 supplies the SPM 13 with an SPM current designated by the CPU 25. The VCM driver 182 supplies the VCM 15 with a VCM current designated by the CPU 25.

When the power supply to the HDD has been interrupted, the controller 183 executes the 1st-retract by turning on the 1st-retract switches 186a, 186b and 186c only for the 1st-retract time period. After the 1st-retract time period elapses, the controller 183 turns off the 1st-retract switches 186a, 186b and 186c, and executes the 2nd-retract by turning on the 2nd-retract switch 189. The controller 183 also contains a register (not shown) in which the CPU 25 sets information indicative of the 1st-retract time period.

The capacitor 184 is charged with the power supply voltage of the HDD. The capacitor 184 is connected to the controller 183 and used as a backup power supply for enabling the controller 183 to operate during power off. Unlike the capacitor 19, the capacitor 184 is not used as a power supply for a mechanical operation. Therefore, the capacitance of the capacitor 184 may be sufficiently small as compared with the capacitor 19. A backup battery may be used in place of the capacitor 184.

The power-off detector 185 monitors the power supply voltage of the HDD, and determines that the power supply has been interrupted, if the power supply voltage is not more than a predetermined value. The 1st-retract switches 186a, 186b and 186c are connected, at one side, to U-, V- and W-phase motor coils 13U, 13V and 13W of the SPM 13, respectively, and commonly connected, at the other side, to the anode of a diode 187. The cathode of the diode 187 is connected to the input of the rectifier 188. The output of the rectifier 188 is connected to one (e.g. end 151) of the ends 151 and 152 of the coil (VCM coil) 150 of the VCM 15. In the embodiment, when a current flows through the VCM 15 from the end 151 to the end 152, the head 12 is moved toward the outer periphery of the disk 11, while when a current flows through the VCM 15 from the end 152 to the end 151, the head 12 is moved toward the inner periphery. The 2nd-retract switch 189 has one end and the other end thereof connected to the cathode of a diode 19a and the end 151 of the VCM 15, respectively. The switches 186a, 186b, 186c and 189 are formed of, for example, FETs (Field Effect Transistors), and are turned on and off if the control signal from the controller 184 is at low level and at high level, respectively.

Figure 5:
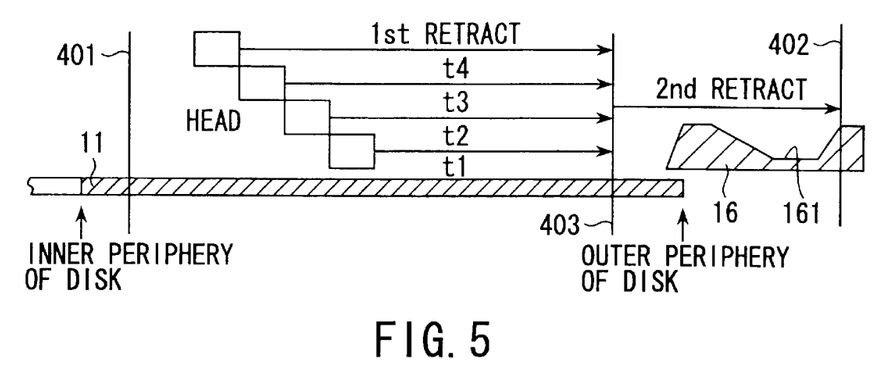
FIG. 5 is a conceptual view useful in explaining the retract of a head executed upon power supply interruption in the embodiment.

Referring then to FIG. 5, a description will be given of the feature of head retraction assumed at the interruption of power supply. At the interruption of power supply, the controller 183 in the driver IC 18 executes the 1st-retract so as to move the head 12 from its present position to the predetermined retract change position 403 on the disk 11. The controller 183 performs the 1st-retract by flowing the output current of the rectifier 188 to the VCM coil 150 of the VCM 15 for the 1st-retract time period, which is set in the controller 183 and determined from the present head position. The rectifier 188 generates its output current by rectifying a current from the SPM 13, which is generated by a back EMF occurring in the SPM 13 at the interruption of power supply. Hereinafter, a current from the SPM 13 indicates a current generated by a back EMF that occurs in the SPM 13 at the interruption of power supply.

The retract change position 403 is set, for example, close to the ramp 16. When setting the retract change position 403, the following two points are considered. The first point is to set the retract change position so that the head 12 can be always retracted onto the parking portion 161 of the ramp 16 when the 2nd-retract has been executed by flowing a current from the capacitor 19 to the VCM coil 150 of the VCM 15. The second point is to set the retract change position so that the amount of rebound of the head 12 to the disk 11 side, which occurs when the support frame 143 of the actuator 14 has been brought into contact with the outer periphery stopper 17a as a result of the 2nd-retract, can be minimized. The rebound of the head 12 to the disk 11 side will be described later. The 1st-retract time period is set at a value required for moving, by the 1st-retract, the head 12 from a position thereof, assumed at the interruption of power supply, to the retract change position 403. In the embodiment, the position (radial position) of the head 12 assumed when the actuator 14 is in contact with the outer periphery stopper 17a will be hereinafter referred to as an "outer periphery stopper position 402", while the position (radial position) of the head 12 assumed when the actuator 14 is in contact with the inner periphery stopper 17a will be hereinafter referred to as an "inner periphery stopper position 401".

Figure 6:
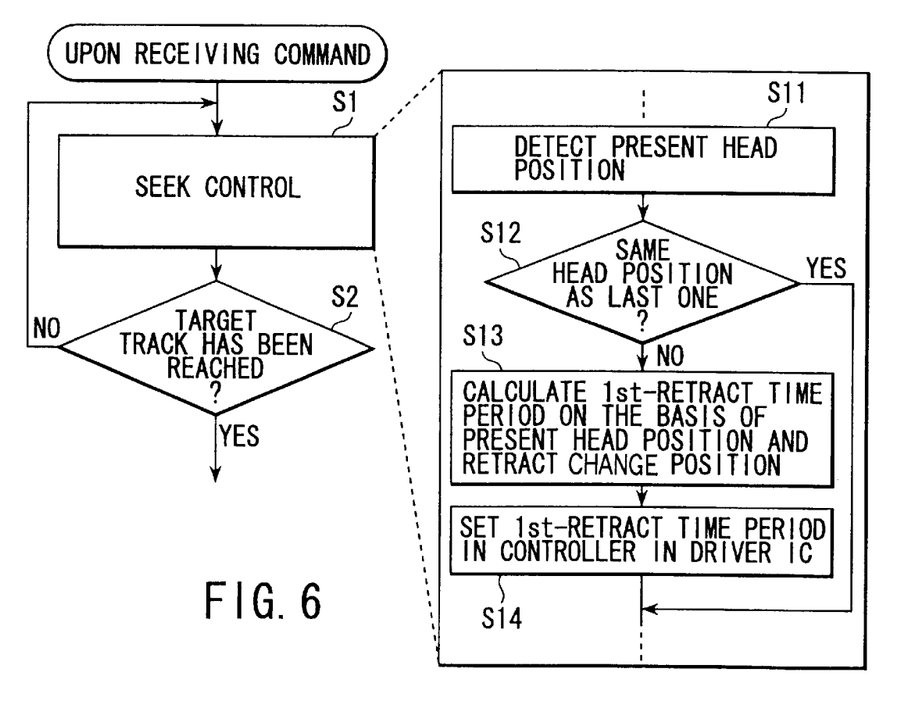
FIG. 6 is a flowchart useful in explaining a 1st-retract-time-period setting operation executed by a CPU 25 in the embodiment.
Figure 7:
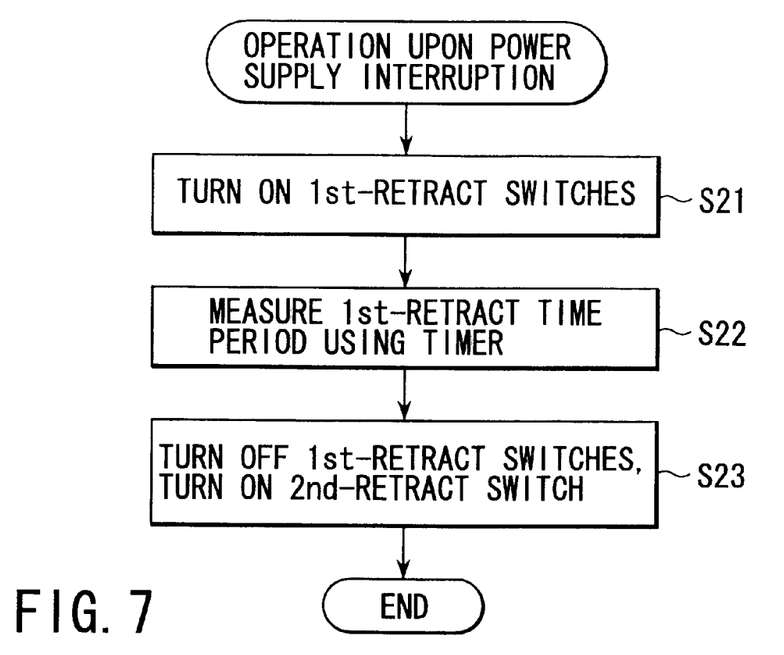
FIG. 7 is a flowchart useful in explaining the operation of a controller 183 executed upon power supply interruption in the embodiment.

Referring then to the flowcharts of FIGS. 6 and 7, a description will be given of operations for realizing the 1st-retract and 2nd-retract illustrated in FIG. 5. At first, when the CPU 25 has received a command to access the disk 11, which is supplied from the host system via the host interface 24 and the disk controller 23, it executes seek control for moving the head 12 to a target track on the disk 11 designated by the command (step S1). Specifically, as well known, the CPU 25 periodically detects a cylinder (track) position in which the head 12 is positioned, thereby executing, using the VCM driver 182, velocity control corresponding to the difference between the cylinder position and a target track position.

Each time the CPU 25 detects a new head position (indicated by a cylinder position) during the seek control (steps S11 and S12), it calculates the 1st-retract time period on the basis of the detected head position and the predetermined retract change position 403 (see FIG. 5) (step S13). As described above, the 1st-retract time period is a time period required for moving the head 12 from the present position to the retract change position 403 by a current from the SPM 13. In other words, the 1st-retract time period indicates a time period required for supplying the VCM 15 with a current from the SPM 13. The CPU 25 sets the calculated 1st-retract time period in the controller 183 contained in the driver IC 18 (step S14). Accordingly, the controller 183 always stores an updated 1st-retract time period corresponding to an updated head position.

Suppose here that the power supply to the HDD has been interrupted. If the power-off detector 185, which monitors the power supply voltage of the HDD, detects that the power supply voltage is not more than a predetermined value, it determines that the power supply to the HDD has been interrupted, and activates the controller 183. The controller 183 is operable even after the interruption of power supply to the HDD, using, as a backup power supply, the capacitor 184 charged with the power supply voltage of the HDD. Further, information on the 1st-retract time period set in a register in the controller 183 by the CPU 25 is maintained therein.

When the controller 183 has been activated by the power-off detector 185, the controller 183 turns on the 1st-retract switches 186a–186c (step S21). The controller 183 also measures the 1st-retract time period, using a timer (step S22).

When the 1st-retract switches 186a–186c have been turned on, currents generated at the coils 13U, 13V and 13W of the SPM 13 flow to the rectifier 188 via the diode 187. The rectifier 188 rectifies a current obtained by subjecting, to an OR process, the currents generated at the coils 13U, 13V and 13W, and outputs the rectified current to the end 151 of the VCM coil 150 of the VCM 15. The VCM 15, in turn, supplies the actuator 14 with a driving force for moving it toward the outer periphery of the disk 11. Thereby, the 1st-retract of moving the head 12 from its present position toward the outer periphery of the disk 11 is started.

After the 1st-retract time period elapses, the controller 183 turns off the 1st-retract switches 186*a*–186*c*, and at the same time, turns on the 2nd-retract switch 189 (step S23). At this time, the head 12 is positioned near the retract change position 403 (see FIG. 5) on the disk 11.

After the switches 186*a*–186*c* are turned off and the switch 189 is turned on, discharge of the charge accumulated in the capacitor 19 is started. As a result, the current to be supplied to the coil end 151 of the VCM 15 is switched from a current from the SPM 13 to a current generated by discharge of the capacitor 19. Thus, the 2nd-retract for retracting the head 12 from a position near the retract change position 403 to the ramp 16 is started. The capacitor 19 has a capacitance that enables a reliable retraction, by the 2nd-retract, of the head 12 from the retract change position 403 to the parking portion 161 of the ramp 16, with the rebound amount of the head 12 from the outer periphery stopper 17*a* kept at a minimum value. The rebound of the head 12 from the outer periphery stopper 17*a* indicates a phenomenon in which when the support frame 143 of the actuator 14 has been brought into contact with the outer peripheral stopper 17*a*, the tip of the actuator 14 is rebounded toward the inner periphery of the disk 11 since the movement speed of the actuator 14 (the acceleration of the head) is too high, with the result that the head 12 falls on the disk 11. In an HDD in which the power supply voltage is low and hence the capacitor 19 cannot provide a sufficient voltage at the start of discharge, it would be better to use a booster circuit. It is sufficient if the power supply voltage of the HDD is increased by the booster circuit, and the capacitor 19 is charged with the increased voltage.

As described above, in the embodiment, the back EMF of the SPM 13 is used as the current source of the VCM 15 for the 1st-retract, which is executed to move the head 12 from a position thereof assumed at the interruption of power supply to the HDD, to a position near the retract change position 403. Further, in the embodiment, a charge accumulated in the capacitor (2nd-retract capacitor) 19 is used as the current source of the VCM 15 for the 2nd-retract, which is executed to move the head 12 from the position near the retract change position 403 to the parking portion 161 of the ramp 16. In other words, in the embodiment, the back EMF of the SPM 13 and the charge of the capacitor 19 are used, at different times, as the current sources of the VCM 15 for retracting the head 12 onto the ramp 16 upon the interruption of power supply to the HDD. More specifically, the charge of the capacitor 19 is supplied to the VCM 15 immediately after the back EMF. This enables a reliable retraction of the head 12 onto the parking portion 161 of the ramp 16. Moreover, it is not necessary for the capacitor 19 to have a large capacitance. Therefore, the HDD configuration of the embodiment is applicable to a compact HDD, such as a 1.8-inch HDD, which employs just a compact SPM 13 and hence cannot retract the head 12 onto the ramp 16 only by a current from the SPM 13.

The above-described 2nd-retract is open-loop control in which the charge of a capacitor is discharged. In general, head retraction based on the open-loop control may involve these disadvantages: The movement speed of the actuator is too low to retract the head onto the ramp, or it is excessively high and hence the actuator may be rebounded by the outer periphery stopper. In the latter case, the head may land on the disk and stick to it. However, in the embodiment, the start position of the 2nd-retract is set near the predetermined retract change position 403, which minimizes the amount of rebound of the head 12 from the outer periphery stopper 17*a* and enables a reliable and safe retraction of the head 12.

In addition, in the embodiment, during the seek control, the CPU 25 calculates the 1st-retract time period each time the cylinder position, in which the head is positioned, is detected as the present head's position, thereby setting the calculation result in the controller 183. However, the time period required for the seek control operation is negligibly short, compared to that in which the HDD is in the ON state. In other words, in the HDD, during almost all the time period in which the HDD is operable, the head 12 is positioned in a target position. In light of this, the 1st-retract time period may be modified such that it is set once for one command. In this case, the CPU 25 calculates a time period required for moving the head from a target track designated by a command (read/write command) from the host system, to the retract change position 403, when a seek control operation of moving the head 12 to the target track has finished. The CPU 25 sets, in the controller 183, the calculated time period as the 1st-retract time period. The setting of the 1st-retract time period in the controller 183 only once for one command simplifies the process and reduces the load on the CPU 25.

Although in the embodiment, the retract change position 403 is located near the ramp 16, it may be located remote from the ramp 16. However, if the retract change position 403 is located remote from the ramp 16, for example, if it is located on a radially middle portion of the disk 11, it is necessary to change the direction in which the 1st-retract is executed, depending upon the position of the head 12. To this end, it is sufficient if a retract switch similar to the retract switch 189 is additionally provided, for example, between the rectifier 188 and the coil end 151 of the VCM 15 and between the rectifier 188 and the coil end 152 of the VCM 15. In this case, a selected one of the two retract switches needs to be turned on by the controller 183.

[First Modification]

In the above-described embodiment, each time a new cylinder position in which the head 12 is positioned is detected during the seek control operation, the 1st-retract time period is calculated on the basis of the detected cylinder position. However, in light of variations in a current from the SPM 13, it is not always necessary to calculate the 1st-retract time period on the basis of the cylinder position. A description will now be given of a first modification of the HDD shown in FIG. 1, in which a 1st-retract time period required for moving the head 12 from a zone, in which the head 12 is presently positioned, to the retract change position is determined.

Figure 8:
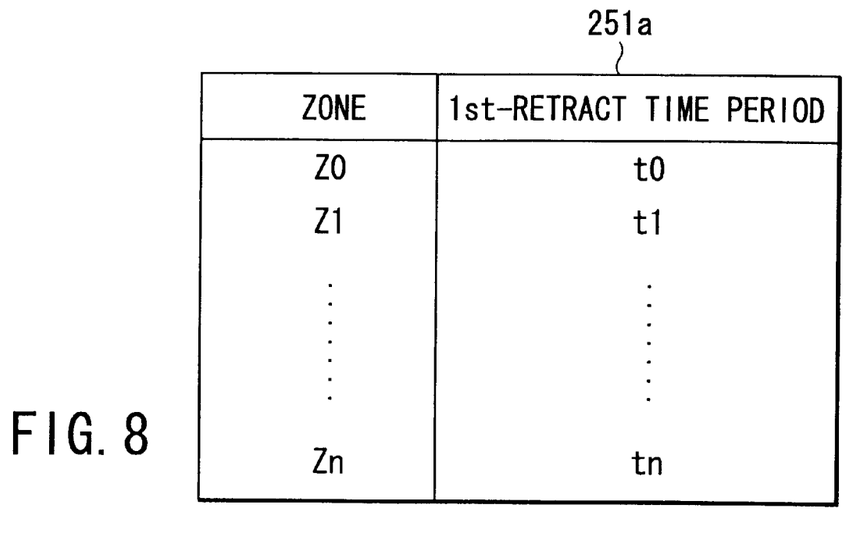
FIG. 8 is a view illustrating a data example of a table 251a used in a first modification of the embodiment.

In the first modification, the ROM 251 shown in FIG. 1 prestores a table 251*a* of a data configuration as shown in FIG. 8. The table 251*a* prestores, for respective zone numbers, 1st-retract time periods each required for moving the head 12 from a corresponding one of zones Z0–Zn of the disk 11 to the retract change position 403 (see FIG. 5), using a current from the SPM 13.

Figure 9:
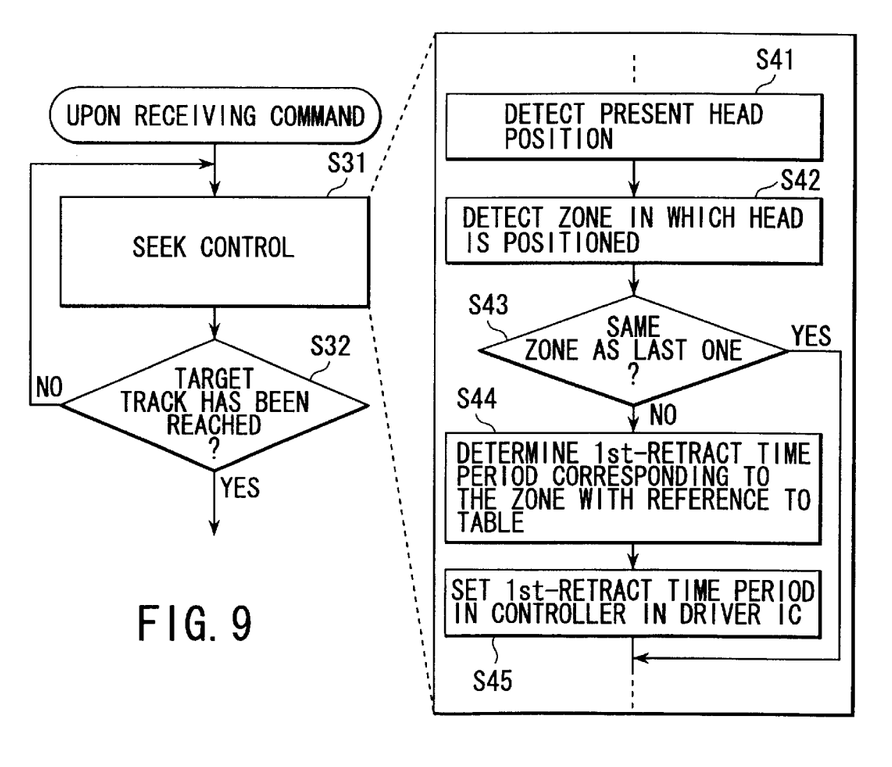
FIG. 9 is a flowchart useful in explaining a 1st-retract-time-period setting operation executed by the CPU 25 using the table 251a in the first modification of the embodiment.

In the first modification, during the seek control operation, the 1st-retract time period is set in accordance with the flowchart of FIG. 9, using the table 251*a*. Specifically, upon receiving a command to access the disk 11, output from the host system, the CPU 25 first executes seek control to move the head 12 to a target track on the disk 11 designated by the command (step S31). During the seek control, the CPU 25 detects a zone, in which the head 12 is positioned, each time it detects the position of the head 12 (indicated by a cylinder position). In other words, the CPU 25 detects a zone in which the head 12 is presently positioned (steps S41 and S42). The zone in which the head 12 is positioned is a kind of head position. Subsequently, if the detected zone differs from a zone detected in the last loop, i.e. if a new zone is detected (step S43), the CPU 25 determines the 1st-retract time period by referring to the portion of the table 251a, which corresponds to the zone number of the new zone (step S44). Then, the CPU 25 sets the determined 1st-retract time period in (a register contained in) the controller 183 of the driver IC 18 (step S45).

As described above, in the first modification, only when a new zone in which the head 12 is presently positioned has been detected, the table 251a is referred to, thereby determining the 1st-retract time period and setting it in the controller 183. This configuration enables a reduction of the load on the CPU 25, compared to the embodiment where the 1st-retract time period is calculated and set in the controller 183, each time a new head position (indicated by a cylinder position) is detected. In addition, the table 251a is used to determine the 1st-retract time period, which further reduces the load on the CPU 25 than in the case of determining the 1st-retract time period by calculation.

Instead of setting the 1st-retract time period each time a new zone is detected, the 1st-retract time period may be set only once for one command in the following manner. When the seek control operation of moving the head 12 to a target track designated by a command output from the host system has finished, the CPU 25 refers to the portion of the table 251a, which corresponds to the zone number of a zone to which the target track belongs, thereby determining the 1st-retract time period. The CPU 25 then sets the determined 1st-retract time period in the controller 183. This configuration enables a reduction of the load on the CPU 25, compared to the case where the 1st-retract time period is determined and set in the controller 183, each time a new zone is detected.

[Second Modification]

A current from the SPM 13, the torque of the VCM 15 and the resistance of the VCM coil 150 vary depending upon temperature. Accordingly, the distance through which the head 12 moves for the same 1st-retract time period varies depending upon temperature. Referring now to the flowchart of FIG. 10, a description will be given of a second modification in which the 1st-retract time period is calculated in light of a change in the temperature of the HDD.

Figure 10:
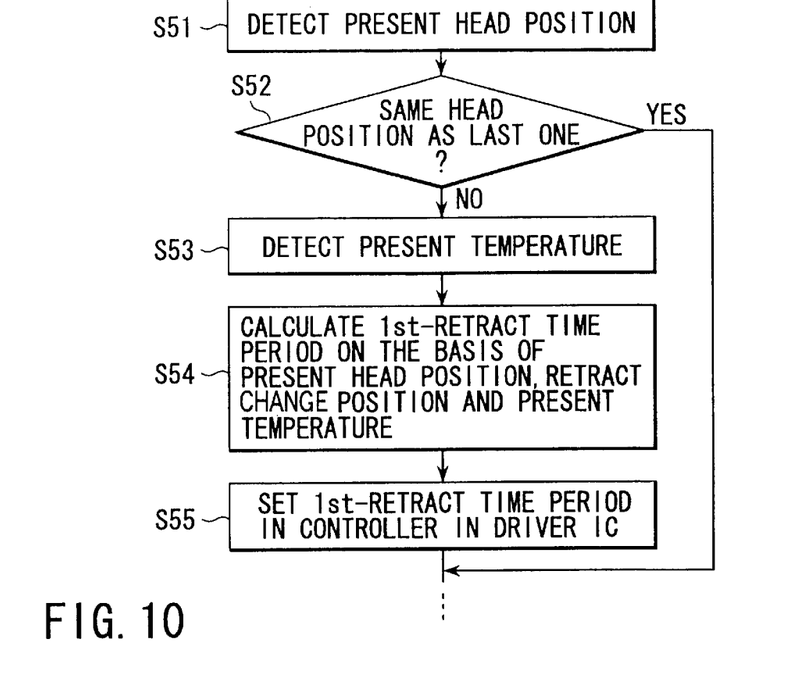
FIG. 10 is a flowchart useful in explaining a 1st-retract-time-period setting operation executed by the CPU 25 in light of a temperature change in a second modification of the embodiment.

Upon receiving a command to access the disk 11, output from the host system, the CPU 25 executes, as described in the embodiment, seek control for moving the head 12 to a target track on the disk 11 designated by the command. During the seek control, whenever detecting a new head position (indicated by a cylinder position) (steps S51 and S52), the CPU 25 converts (a voltage indicative of) a temperature, detected by a temperature sensor 26, into a digital value, using the A/D converter 253, and holds the conversion result (step S53).

Subsequently, on the basis of the detected present head position, the retract change position 403 (see FIG. 5) and the detected present temperature, the CPU 25 calculates the 1st-retract time period required, at the detected temperature, for moving the head 12 from the present head position to the retract change position 403, using a current from of the SPM 13 (step S54). After that, the CPU 25 sets the determined 1st-retract time period in (the register contained in) the controller 183 of the driver IC 18 (step S55).

As described above, in the second modification, the 1st-retract time period is set in light of a change in temperature, which enables the head 12 to be accurately moved to the retract change position 403 by the 1st-retract. The method of setting the 1st-retract time period in light of a temperature change can be also applicable to the first modification. In this case, the 1st-retract time period obtained with reference to the table 251a is corrected to a value corresponding to a present temperature.

[Third Modification]

With reference to the conceptual view of FIG. 11, a description will be given of a third modification of the HDD shown in FIG. 1, in which the outer periphery stopper position is used as the retract change position.

The third modification is characterized in two points. The first characterizing point is that an outer periphery stopper position A2 is used as a retract change position A3 as shown in FIG. 11. The second characterizing point is that a 1st-retract time period t11 is set so that the head 12 can be moved to the outer periphery stopper position A2 by a current from the SPM 13, on whichever portion of the disk 11 the head 12 is positioned at the interruption of power supply to the HDD. The 1st-retract time period t11 is set in (the register contained in) the controller 183 of the driver IC 18 when, for example, the CPU 25 executes an initialization process.

In the third modification, during the interruption of power supply, the controller 183 executes the same operation as in the above-described embodiment. The operation of the controller 183 executed during the interruption of power supply in the third modification will be described briefly with reference to the flowchart of FIG. 7.

During the interruption of power supply, the controller 183 turns on the 1st-retract switches 186a–186c (step S21). At this time, a current from the SPM 13 is supplied to the coil end 151 of the VCM coil 150 of the VCM 15, thereby moving the head 12 toward the outer periphery of the disk 11.

When the 1st-retract time period t11 has elapsed from the start of supplying the VCM 15 with a current from SPM 13, i.e. from the start of a power-off state, the controller 183 turns off the 1st-retract switches 186a–186c and turns on the 2nd-retract switch 189 (steps S22 and S23). As a result, the current to be supplied to the coil end 151 of the VCM 15 is switched from the current from the SPM 13 to a current generated by the discharge of the capacitor 19.

As aforementioned, the 1st-retract time period t11 is set so that the head 12 can be moved to the outer periphery stopper position A2 as the retract change position A3 by a current from the SPM 13, on whichever portion of the disk 11 the head 12 is positioned. Accordingly, after the 1st-retract time period t11 elapses, the head 12 is usually positioned near the outer periphery stopper position A2. That is, the head 12 is positioned on the ramp 16. More specifically, (the support frame 143 of) the actuator 14 is pressed against the outer periphery stopper 17a.

If in this state, the 2nd-retract is executed using a current from the capacitor 19, the head 12 will be placed onto the parking portion 161 of the ramp 16, whereby the rebound of the head 12 toward the disk 11 can be suppressed when the actuator 14 is brought into contact with the outer periphery stopper 17a.

The current from the SPM 13 varies in intensity. Therefore, even if the 1st-retract time period t11 is set so that the head 12 can be moved to the outer periphery stopper position A2 by a current from the SPM 13, on whichever portion of the disk 11 the head 12 is positioned, it is actually possible that the head 12 does not reach the outer periphery stopper 17a as a result of the 1st-retract. For example, the head 12 may stop at an end A4 of the ramp 16. However, even in this state, a force presses the actuator 14 of the head 12 toward the outer periphery of the disk 11 as a result of the supply of the SPM's current to the VCM 15. Therefore, there is no danger of the head 12 falling onto the disk 11.

In the third modification, consideration is given to a case where the head 12 does not reach the outer periphery stopper position A2 but stops at the end A4 of the ramp 16 after the 1st-retract. Therefore, the capacitor (2nd-retract capacitor) 19 employed in this modification is of a capacitance that enables the amount of rebound of the head 12 from the outer periphery stopper 17a to be minimized even if the 2nd-retract is executed where the head 12 is positioned at the ramp end A4, and also enables reliable retraction of the head 12 onto the parking portion 161 of the ramp 16. This capacitor enables the head 12, which stops at the ramp end A4 after the 1st-retract, to be moved to the parking portion 161 of the ramp 16 by the 2nd-retract.

If the 1st-retract time period is set for each head position (indicated by a cylinder position) or each zone in which the head 12 is positioned, as in the embodiment or the first modification, the actuator 14 can be more accurately pressed against the outer periphery stopper 17a by the 1st-retract. The same can be said of a case where the 1st-retract time period is set in light of a temperature change as in the second modification. Thus, the rebound of the head 12 toward the disk 11 can be more reliably suppressed by executing the 2nd-retract with the actuator 14 pressed against the outer peripheral stopper 17a as a result of the 1st-retract.

[Fourth Modification]

A description will be given of a fourth modification of the HDD shown in FIG. 1, in which the inner periphery stopper position is used as the retract change position.

Figure 12:
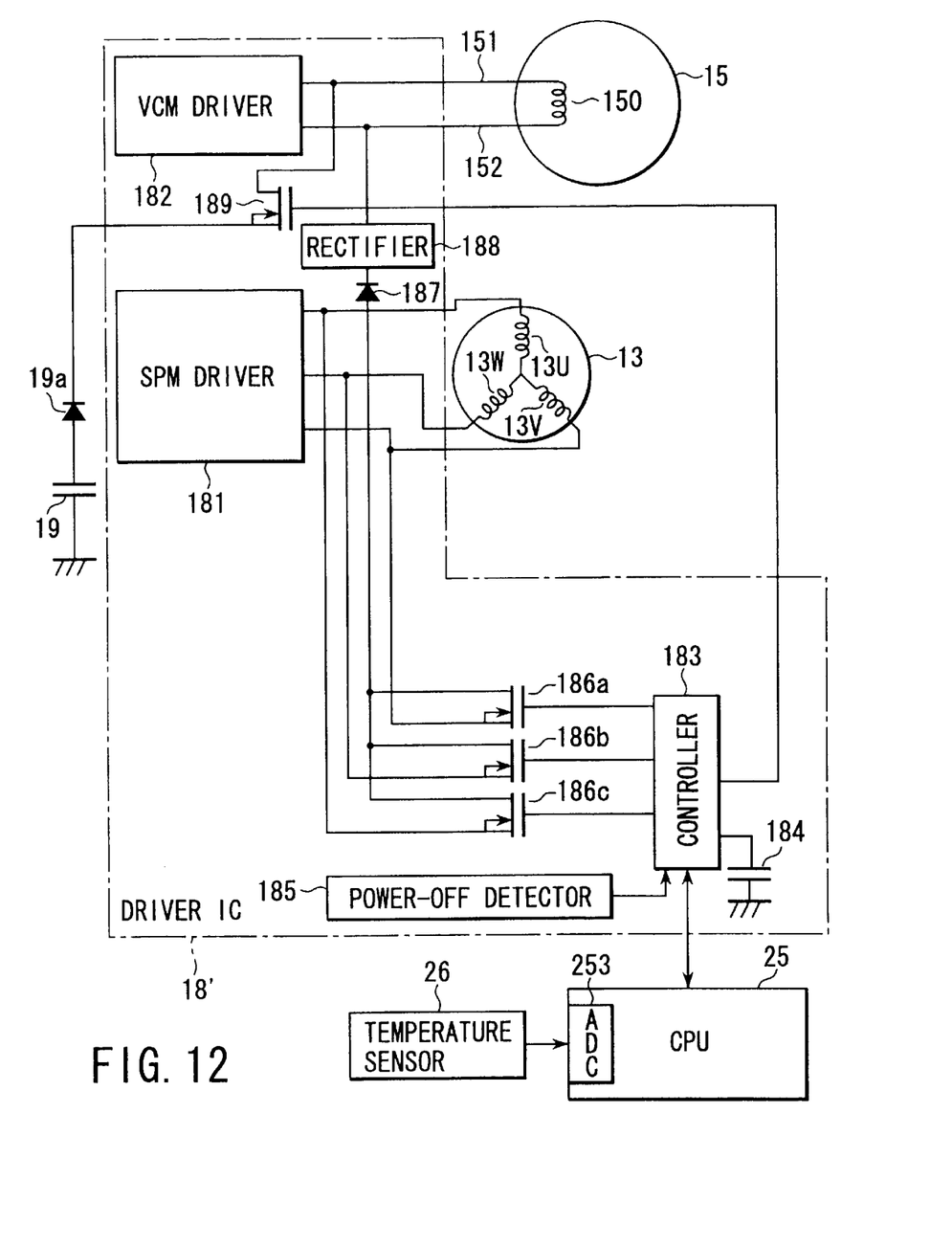
FIG. 12 a view illustrating the configuration of a driver IC 18' used in a fourth modification of the embodiment in place of the driver IC 18 shown in FIG. 1.

In the fourth modification, a driver IC 18' of a configuration as shown in FIG. 12 is used in place of the driver IC 18 shown in FIG. 1. The driver IC 18' is characterized in that the output of the rectifier 188 is connected to the coil end 152 (not to the coil end 151) of the VCM 15. In this case, when the 1st-retract switches 186a–186c have been turned on, a current from the SPM 13 is supplied to the coil end 152 of the VCM 15. As a result, the head 12 is moved toward the inner periphery of the disk 11.

The fourth modification is characterized in two points. The first characterizing point is that an inner periphery stopper position B1 is used as a retract change position B3 as shown in the conceptual view of FIG. 13. The second characterizing point is that a 1st-retract time period t11' is set so that the head 12 can be moved to the inner periphery stopper position B1 by the current from the SPM 13, on whichever portion of the disk 11 the head 12 is positioned at the interruption of power supply to the HDD. The 1st-retract time period t11' is set in (the register contained in) the controller 183 of the driver IC 18 when, for example, the CPU 25 executes an initialization process.

In the fourth modification, during the interruption of power supply, the controller 183 executes the same operation as in the above-described embodiment. The operation of the controller 183 executed during the interruption of power supply in the fourth modification will be described briefly with reference to the flowchart of FIG. 7.

During the interruption of power supply, the controller 183 of the driver IC 18' turns on the 1st-retract switches 186a–186c (step S21). At this time, a current from the SPM 13 is supplied to the coil end 152 of the VCM 15, thereby moving the head 12 toward the inner periphery of the disk 11.

When the 1st-retract time period t11' has elapsed from the start of the supply of the SPM's current to the VCM 15, the controller 183 turns off the 1st-retract switches 186a–186c and turns on the 2nd-retract switch 189 (steps S22 and S23). As a result, the supply of the SPM's current to the coil end 152 of the VCM 15 is stopped. At the same time, a current from the capacitor 19 is supplied to the coil end 151 of the VCM 15.

Figure 13:
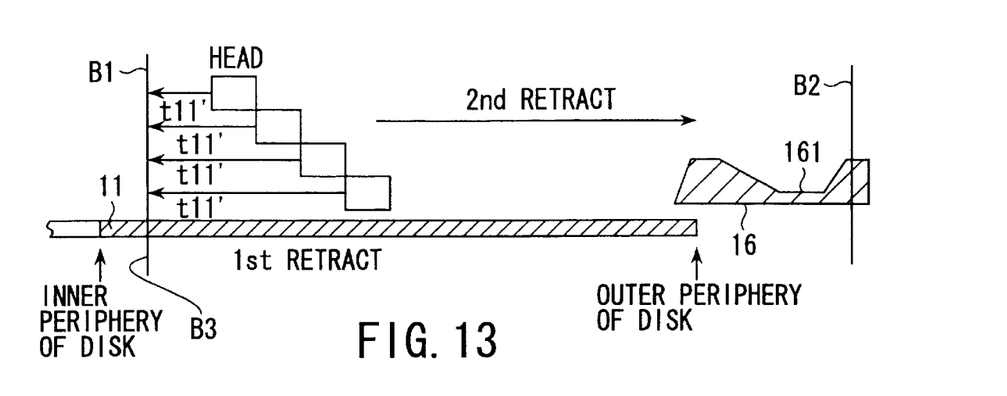
FIG. 13 is conceptual view useful in explaining the retract of a head executed upon power supply interruption in the fourth modification of the embodiment.

The 1st-retract time period t11' is set so that the head 12 can be moved to the inner periphery stopper position B1 as the retract change position B3 by the current from the SPM 13, on whichever portion of the disk 11 the head 12 is positioned. Accordingly, after the 1st-retract time period t11' elapses, the head 12 is usually positioned near the inner periphery stopper position B1. More specifically, (the support frame 143 of) the actuator 14 is pressed against the outer periphery stopper 17b.

In the fourth modification, the capacitor (2nd-retract capacitor) 19 is of a capacitance that enables the amount of rebound of the head 12 from the outer periphery stopper 17a to be minimized when the 2nd-retract has been executed where the head 12 is positioned in the inner periphery stopper position B1, and also enables reliable retraction of the head 12 onto the parking portion 161 of the ramp 16. Further, in the fourth modification, the 2nd-retract is executed using a current from the capacitor 19, after the 1st-retract time period-retract time period t11' elapses from the start of the supply of the SPM's current to the VCM 15, i.e. when the head 12 is positioned in the inner periphery stopper position B1 as a result of the execution of the 1st-retract. In the fourth modification, the distance from the position of the head 12, assumed at the start of the 2nd-retract, to the ramp 16 is constant. This means that the head 12, which is positioned in the inner periphery stopper position B1 at the start of the 2nd-retract, can be reliably retracted to the parking portion 161 of the ramp 16 by the 2nd-retract, and also that the rebound of the head 12 toward the disk 11, occurring then the actuator 14 is in contact with the outer periphery stopper 17a, can be suppressed.

[Fifth Modification]

In the embodiment and first to fourth modifications, a current from the SPM 13 is used for the 1st-retract, while a current from the capacitor (2nd-retract capacitor) 19 is used for the 2nd-retract. However, as a current for driving the VCM 15 during the 2nd-retract, the sum of a current from the capacitor 19 and a current from the SPM 13 can be used. Referring now to the flowchart of FIG. 14, a description will be given of a fifth modification of the HDD shown in FIG. 1, in which the 2nd-retract is executed simultaneously using both the currents.

Figure 14:
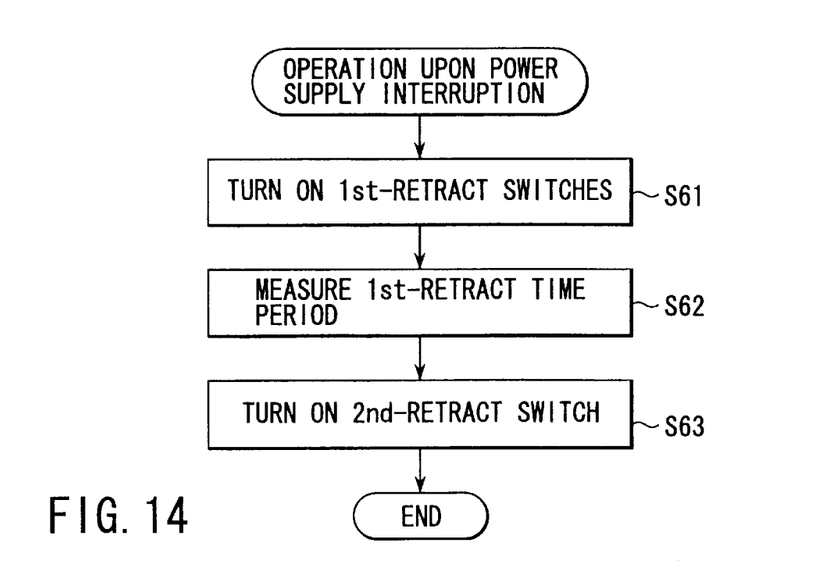
FIG. 14 is a flowchart useful in explaining the operation of a controller 183 executed upon power supply interruption in a fifth modification of the embodiment.

During the interruption of power supply, the controller 183 of the driver IC 18 shown in FIG. 2 turns on the 1st-retract switches 186a–186c (step S61). At this time, a current from the SPM 13 is supplied to the VCM 15, thereby moving the head 12 toward the retract change position.

When a 1st-retract time period has elapsed from the start of the supply of the SPM's current to the VCM 15, i.e. when the 1st-retract has finished, the controller 183 turns on the 2nd-retract switch 189, with the 1st-retract switches 186a–186c kept in the ON state (steps S62 and S63). Thereby, both the current from the SPM 13 and a current from the capacitor 19 are simultaneously supplied to the VCM 15. This being so, even if the 1st-retract operation cannot achieve sufficient retract, or even if the capacitance of the capacitor 19 is insufficient for the 2nd-retract, the head 12 can be reliably retracted onto the ramp 16.

In the embodiment and first to fifth modifications, the present invention is applied to an HDD (hard disk drive) equipped with a head used to read/write data. However, the present invention is not limited to this, but also applicable to a disk drive other than the HDD, such as an optical disk drive, if this disk drive is equipped with a ramp for retracting a head thereon. The present invention is further applicable to a disk drive equipped with a head used only to read data, such as a CD-ROM drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of supplying, upon power-off of a power supply for a disk drive, a current to a voice coil motor to drive a head actuator that supports a head, thereby retracting the head onto a ramp provided outside a disk medium near an outer periphery of the disk medium, comprising:

determining, during operation of the disk drive, a retract time period required to move the head from a position of the head to a predetermined retract change position, using a back electromotive force that occurs, upon the power-off of the power supply, in a spindle motor used to rotate the disk medium;

supplying the voice coil motor with a current generated by the back electromotive force of the spindle motor for the retract time period after the power-off of the power supply, thereby moving the head toward the retract change position; and supplying, when the retract time period has elapsed after the power-off of the power supply, the voice coil motor with a current generated by discharge of a retract capacitor that accumulates a charge from the power supply, thereby moving the head onto the ramp.

2. The method according to claim 1, wherein the position of the head is a position of a cylinder on which the head is positioned.

3. The method according to claim 2, further comprising detecting the position of the cylinder on which the head is positioned, during seek control executed to move the head to a target track on the disk medium, and wherein said determining the retract time period is executed each time a position of a new cylinder, which differs from the detected cylinder, is detected in said detecting the position of the cylinder on which the head is positioned.

4. The method according to claim 1, wherein said determining the retract time period is executed, using the target track as the position of the head, each time the seek control, which is executed to move the head to the target track on the disk medium, is finished.

5. The method according to claim 1, wherein the position of the head is a position of one of concentric zones, into which a recording surface of the disk medium is divided, the head being positioned in the one of the concentric zones.

6. The method according to claim 5, further comprising:

detecting a position of a cylinder on which the head is positioned, during seek control executed to move the head to a target track on the disk medium; and detecting, each time the position of the cylinder on which the head is positioned is detected, the position of the one of the zones, in which the head is positioned, on the basis of the detected position of the cylinder, and wherein said determining the retract time period is executed each time a position of a new zone, which differs from the detected zone, is detected in said detecting the position of the zone in which the head is positioned.

7. The method according to claim 6, wherein said determining the retract time period determines the retract time period corresponding to the detected position of the new zone, referring to a table which stores retract time periods, for respective zone numbers, each required for moving the head from a position of a corresponding zone to the retract change position using the back electromotive force of the spindle motor.

8. The method according to claim 1, wherein the retract change position is on the disk medium near the ramp.

9. The method according to claim 1, wherein the retract change position is a position of the head, in which the head actuator is brought into contact with an outer periphery stopper that limits an operation of the head actuator, the outer periphery stopper being located in a position in which the outer periphery stopper prevents the head from jumping over the ramp to an outside of the disk medium.

10. The method according to claim 1, wherein the retract change position is a position of the head, in which the head actuator is brought into contact with an inner periphery stopper that limits an operation of the head actuator, the inner periphery stopper being located in a position in which the inner periphery stopper prevents the head from jumping over an inner periphery of the disk medium toward the spindle motor.

11. The method according to claim 1, further comprising simultaneously supplying the voice coil motor with the current generated by the back electromotive force of the spindle motor, in addition to the current generated by the discharge of the retract capacitor, even after the power supply is powered off and the retract time period elapses.

12. The method according to claim 1, wherein the retract capacitor is of a capacitance that enables output of a current required for retracting the head from the retract change position to the ramp.

13. The method according to claim 1, further comprising detecting a temperature of the disk drive, and wherein said determining the retract time period determines the retract time period in accordance with the detected temperature.

14. A method of supplying, upon power-off of a power supply for a disk drive, a current to a voice coil motor to drive a head actuator that supports a head, thereby retracting the head onto a ramp provided outside a disk medium near an outer periphery of the disk medium, comprising:

supplying, for a predetermined retract time period after the power-off of the power supply, the voice coil motor with a current generated by a back electromotive force that occurs, upon the power-off of the power supply, in a spindle motor used to rotate the disk medium, thereby moving the head toward a predetermined retract change position, the predetermined retract change position being a position of the head in which the head actuator is brought into contact with an outer periphery stopper that limits an operation of the head actuator, the outer periphery stopper being located in a position in which the outer periphery stopper prevents the head from jumping over the ramp to an outside of the disk medium, the predetermined retract time period being a time period required for moving the head to the predetermined retract change position irrespective of a position of the head assumed upon the power-off of the power supply; and supplying, when the retract time period has elapsed after the power-off of the power supply, the voice coil motor with a current generated by discharge of a retract capacitor that accumulates a charge from the power supply, thereby pressing the head actuator against the outer periphery stopper.

15. The method according to claim 14, further comprising simultaneously supplying the voice coil motor with the current generated by the back electromotive force of the spindle motor, in addition to the current generated by the discharge of the retract capacitor, even after the power supply is powered off and the predetermined retract time period elapses.

16. The method according to claim 14, wherein the retract capacitor is of a capacitance that enables output of a current required for retracting the head from a disk-medium-side end of the ramp onto the ramp.

17. A method of supplying, upon power-off of a power supply for a disk drive, a current to a voice coil motor to drive a head actuator that supports a head, thereby retracting the head onto a ramp provided outside a disk medium near an outer periphery of the disk medium, comprising:

supplying, for a predetermined retract time period after the power-off of the power supply, the voice coil motor with a current generated by a back electromotive force that occurs, upon the power-off of the power supply, in a spindle motor used to rotate the disk medium, so that the head will be moved to a predetermined retract change position, the predetermined retract change position being a position of the head, in which the head actuator is brought into contact with an inner periphery stopper that limits an operation of the head actuator, the inner periphery stopper being located in a position in which the inner periphery stopper prevents the head from jumping over an inner periphery of the disk medium toward the spindle motor, the predetermined retract time period being a time period required for moving the head to the predetermined retract change position irrespective of a position of the head assumed upon the power-off of the power supply; and supplying, when the retract time period has elapsed after the power-off of the power supply, the voice coil motor with a current generated by discharge of a retract capacitor that accumulates a charge from the power supply, thereby moving the head toward the ramp.

18. The method according to claim 17, further comprising simultaneously supplying the voice coil motor with the current generated by the back electromotive force of the spindle motor, in addition to the current generated by the discharge of the retract capacitor, even after the power supply is powered off and the predetermined retract time period elapses.

19. The method according to claim 17, wherein the retract capacitor is of a capacitance that enables output of a current required for retracting the head from the predetermined retract change position to the ramp.

20. A disk drive apparatus comprising:
a disk medium on which data is recorded;
a spindle motor to rotate the disk medium;
a head to read data from the disk medium;
a head actuator that supports the head and moves the head in a radial direction of the disk medium;
a voice coil motor to drive the head actuator;
a ramp provided outside the disk medium near an outer periphery of the disk medium;
a capacitor charged by a power supply for the disk drive;
a switch circuit configured to supply the voice coil motor with one of a current generated by a back electromotive force that occurs in the spindle motor upon the power-off of the power supply, and a current generated by discharge of the capacitor, the switch circuit supplying the voice coil motor with the current from the spindle motor in a first retract mode, the current from the spindle motor having a polarity that causes the head to move toward a predetermined retract change position, the switch circuit supplying the voice coil motor with the current from the capacitor in a second retract mode, the current from the capacitor having a polarity that causes the head to move toward the ramp;
means for determining, during operation of the disk drive, a retract time period required to move the head from a position of the head to the predetermined retract change position, using the current from the spindle motor; and
a controller to control the switch circuit, the controller setting the switch circuit to the first retract mode for the retract time period, determined by the determining means, after power-off of the power supply, the controller switching the switch circuit from the first retract mode to the second retract mode when the retract time period has elapsed after the power-off of the power supply.

21. A disk drive apparatus comprising:
a disk medium on which data is recorded;
a spindle motor to rotate the disk medium;
a head to read data from the disk medium;
a head actuator that supports the head and moves the head in a radial direction of the disk medium;
a voice coil motor to drive the head actuator;
a ramp provided outside the disk medium near an outer periphery of the disk medium;
an outer periphery stopper to limit an operation of the head actuator, the outer periphery stopper being located in a position in which the outer periphery stopper prevents the head from jumping over the ramp to an outside of the disk medium;
a capacitor charged by a power supply for the disk drive;
a switch circuit configured to supply the voice coil motor with one of a current generated by a back electromotive force that occurs in the spindle motor upon the power-off of the power supply, and a current generated by discharge of the capacitor, the switch circuit supplying the voice coil motor with the current from the spindle motor in a first retract mode, the current from the spindle motor having a polarity that causes the head to move toward a predetermined retract change position, the switch circuit supplying the voice coil motor with the current from the capacitor in a second retract mode, the current from the capacitor having a polarity that causes the head actuator to be pressed against the outer periphery stopper, the predetermined retract change position being a position of the head where the head actuator is in contact with the outer periphery stopper; and
a controller to control the switch circuit, the controller setting the switch circuit to the first retract mode for a predetermined retract time period after power-off of the power supply, the controller switching the switch circuit from the first retract mode to the second retract mode when the predetermined retract time period has elapsed after the power-off of the power supply, the predetermined retract time period being a time period required for moving the head to the predetermined retract change position irrespective of a position of the head assumed upon the power-off of the power supply.

22. A disk drive apparatus comprising:

a disk medium on which data is recorded;

a spindle motor to rotate the disk medium;

a head to read data from the disk medium;

a head actuator that supports the head and moves the head in a radial direction of the disk medium;

a voice coil motor to drive the head actuator;

a ramp provided outside the disk medium near an outer periphery of the disk medium;

an inner periphery stopper to limit an operation of the head actuator, the inner periphery stopper being located in a position in which the inner periphery stopper prevents the head from jumping over an inner periphery of the disk medium toward the spindle motor;

a capacitor charged by a power supply for the disk drive;

a switch circuit configured to supply the voice coil motor with one of a current generated by a back electromotive force that occurs in the spindle motor upon the power-off of the power supply, and a current generated by discharge of the capacitor, the switch circuit supplying the voice coil motor with the current from the spindle motor in a first retract mode, the current from the spindle motor having a polarity that causes the head to move toward a predetermined retract change position, the switch circuit supplying the voice coil motor with the current from the capacitor in a second retract mode, the current from the capacitor having a polarity that causes the head to move toward the ramp, the predetermined retract change position being a position of the head where the head actuator is in contact with the inner periphery stopper; and a controller to control the switch circuit, the controller setting the switch circuit to the first retract mode for a predetermined retract time period after power-off of the power supply, the controller switching the switch circuit from the first retract mode to the second retract mode when the predetermined retract time period has elapsed after the power-off of the power supply, the predetermined retract time period being a time period required for moving the head to the predetermined retract change position irrespective of a position of the head assumed upon the power-off of the power supply.

* * * * *